(12) United States Patent
Bavington (10) Patent No.: US 9,407,643 B1
(45) Date of Patent: Aug. 2, 2016

(54) SYSTEM AND METHOD FOR CONSOLIDATING NETWORK STREAMS FOR NETWORK ANALYSIS

(75) Inventor: Stephen Bavington, Midlothian, VA (US)

(73) Assignee: Spirent Communications, Inc., Sunnyvale, CA (US)

( * ) Notice: Subject to any disclaimer, the term of this patent is extended or adjusted under 35 U.S.C. 154(b) by 2350 days.

(21) Appl. No.: 11/195,602

(22) Filed: Aug. 3, 2005

Related U.S. Application Data (60) Provisional application No. 60/598,047, filed on Aug. 3, 2004.

(51) Int. Cl.
*H04L 29/06* (2006.01)
*G06F 21/55* (2013.01)

(52) U.S. Cl.
CPC ............ *H04L 63/1408* (2013.01); *H04L 63/02* (2013.01); *G06F 21/55* (2013.01); *H04L 63/104* (2013.01)

(58) Field of Classification Search
CPC ... H04L 63/02; H04L 63/0272; H04L 63/104; H04L 63/1408; H04L 63/1425; H04L 63/30; H04L 63/302; H04L 63/304; H04L 63/306; H04L 63/308; G06F 21/55; G06F 21/552
USPC ..................................................... 726/22–25
See application file for complete search history.

(56) References Cited

U.S. PATENT DOCUMENTS

| | | | |
|---|---|---|---|
| 6,026,442 A * | 2/2000 | Lewis et al. ................ | 709/229 |
| 6,453,345 B2 * | 9/2002 | Trcka et al. ................ | 709/224 |
| 7,013,394 B1 * | 3/2006 | Lingafelt et al. ........... | 726/22 |
| 7,035,544 B1 * | 4/2006 | Won ............................ | 398/79 |
| 7,062,783 B1 * | 6/2006 | Joiner ......................... | 726/23 |
| 7,379,857 B2 * | 5/2008 | Piesco ........................ | 703/21 |
| 7,451,483 B2 * | 11/2008 | Chang et al. ................ | 726/15 |
| 7,467,408 B1 * | 12/2008 | O'Toole, Jr. ................ | 726/22 |
| 7,496,662 B1 * | 2/2009 | Roesch et al. .............. | 709/224 |

(Continued)

OTHER PUBLICATIONS

Wikipedia article for "Synchronous optical networking" published Jul. 19, 2004 http://en.wikipedia.org/w/index.php?title= Synchronous_optical_networking&oldid=5200684.*

(Continued)

*Primary Examiner* — Joseph P Hirl
*Assistant Examiner* — Thomas Gyorfi
(74) *Attorney, Agent, or Firm* — Haynes Beffel & Wolfeld LLP; Ernest J. Beffel, Jr.

(57) ABSTRACT

A system for consolidating network streams includes a consolidator in communication with each of a plurality of network streams. Each network stream is associated with a communication path through a network. The consolidator is configured to prevent the plurality of network streams from being networked together, and configured to create at least one virtual local area network (VLAN) within the consolidator. The consolidator is configured to pass information on an ingress port of the consolidator associated with the at least one VLAN to egress ports of the consolidator associated with the at least one VLAN. The system includes a network analyzer in communication with the consolidator. The consolidator is configured to consolidate the plurality of network streams into a single network stream for application to the network analyzer to determine characteristics of each of the plurality of network streams.

22 Claims, 4 Drawing Sheets

(56) References Cited

U.S. PATENT DOCUMENTS

| | | | |
|---|---|---|---|
| 7,587,762 B2* | 9/2009 | Singhal et al. | 726/23 |
| 7,752,665 B1* | 7/2010 | Robertson et al. | 726/23 |
| 2002/0091795 A1* | 7/2002 | Yip | H04L 12/2852 709/218 |
| 2003/0041266 A1* | 2/2003 | Ke et al. | 713/201 |
| 2004/0034800 A1* | 2/2004 | Singhal et al. | 713/201 |
| 2004/0042470 A1* | 3/2004 | Cooper et al. | 370/401 |
| 2004/0120259 A1* | 6/2004 | Jones | H04L 43/12 370/250 |
| 2005/0047098 A1* | 3/2005 | Garnett et al. | 361/735 |
| 2005/0081058 A1* | 4/2005 | Chang et al. | 713/201 |
| 2005/0091396 A1* | 4/2005 | Nilakantan et al. | 709/232 |
| 2006/0023709 A1* | 2/2006 | Hall et al. | 370/389 |
| 2009/0279559 A1* | 11/2009 | Wong et al. | 370/412 |

OTHER PUBLICATIONS

Hucaby, David et al. "VLANs and Trunking" Published Oct. 25, 2002 by Cisco Press. (26 pages) http://www.ciscopress.com/articles/printerfriendly.asp?p=29803.*

"Cisco Catalyst 8500 Series Campus Switch Routers: Overview of Layer 3 Switching and Software Features" Article published Jun. 10, 2004 as verified by the Internet Archive (12 pages). http://web.archive.org/web/20040610230527/http://www.cisco.com/en/US/products/hw/switches/ps5304/products_configuration_guide_chapter09186a00800f0a10.html.*

"ExtremeWare® Software User Guide, Software Version 6.2.2" Published Jun. 2002 (364 pages) http://extrcdn.extremenetworks.com/wp-content/uploads/2014/02/ExtremeWareUser622.pdf.*

* cited by examiner

SYSTEM AND METHOD FOR CONSOLIDATING NETWORK STREAMS FOR NETWORK ANALYSIS

This application claims priority under 35 U.S.C. §119(e) to U.S. Provisional Application No. 60/598,047, filed on Aug. 3, 2005, the entire contents of which are hereby incorporated by reference herein.

BACKGROUND

1. Field of the Invention

The present invention relates to computer network analysis. More particularly, the present invention relates to a system and method for consolidating network streams for network analysis.

2. Background Information

In recent years, the popularity of intrusion detection systems (IDSs) has grown to the point where most Fortune 5000 corporate networks use some type of sophisticated IDS. An IDS operates using much of the same hardware as a packet capture device, as an IDS is, in fact, a type of packet capture device.

However, an IDS is generally not intended as a protocol analyzer, such as that typically used by network engineers to analyze network problems. Rather, an IDS locates known problems in the packet stream by applying, for example, sophisticated pattern matching algorithms. Based on the analysis, the IDS can generate appropriate signals or other alerts when some known condition exists. Such analysis is most often used to detect intrusion from the ingress traffic and/or breach of policy on ingress or egress traffic in a network (e.g., hackers).

Figure 1:
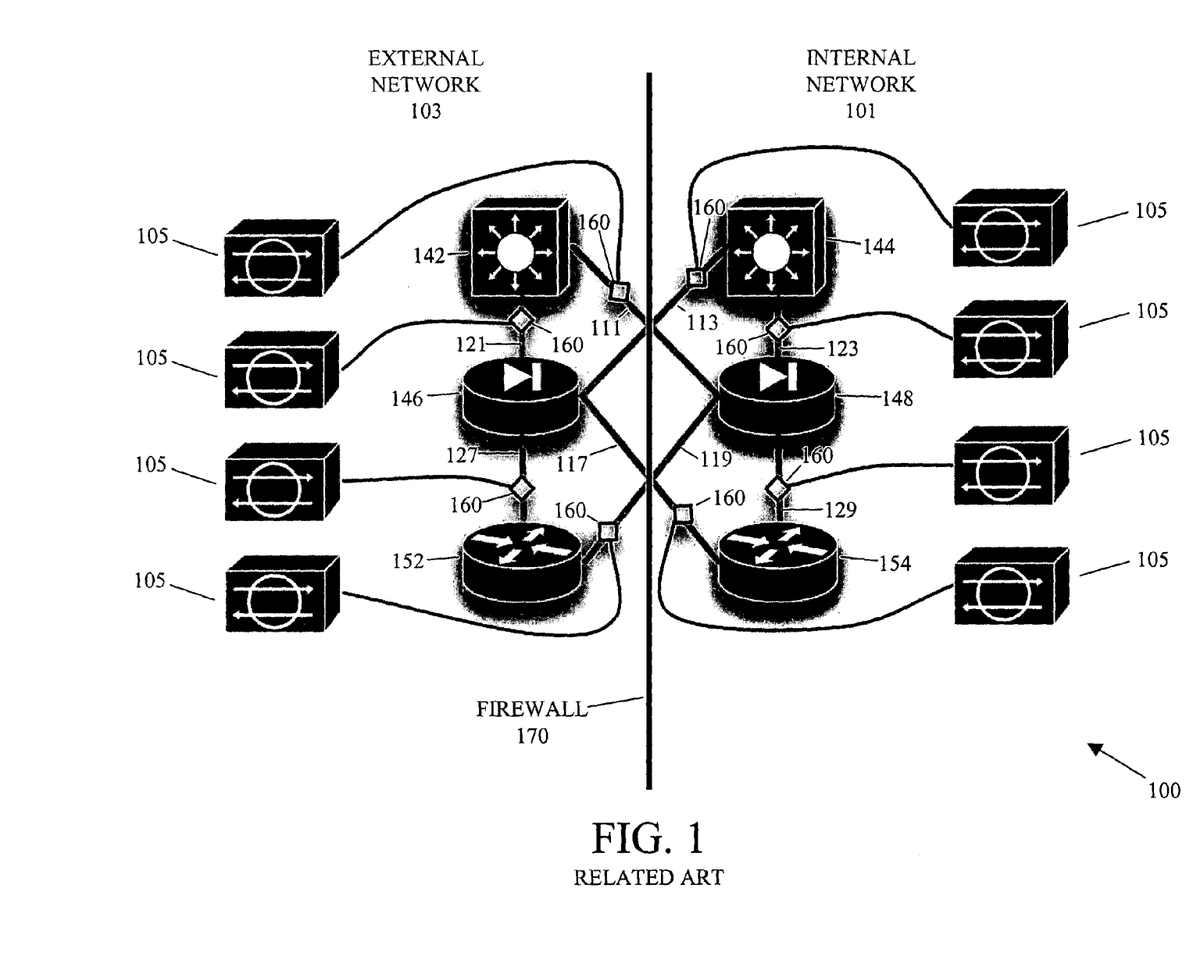
FIG. 1 is a diagram illustrating a configuration of a network in which individual intrusion detection systems are connected to each of a plurality of network streams.

As with many packet capture devices, an IDS may not function unless it has physical layer access to the network stream. In other words, the IDS can be physically inserted in the network stream, or, alternatively, a tap from the network stream can be presented to the IDS. FIG. 1 is a diagram illustrating a configuration of a network 100 in which individual IDSs 105 are connected to each of a plurality of network streams 111, 113, 117, 119, 121, 123, 127 and 129. Each of the plurality of network streams 111, 113, 117, 119, 121, 123, 127 and 129 comprises a communication or other suitable network link between network devices 142, 144, 146, 148, 152 and 154 for passing packet data or other appropriate information between such devices through the network. As illustrated in FIG. 1, each of the IDS 105 is in communication with a respective one of the plurality of network streams 111, 113, 117, 119, 121, 123, 127 and 129 using a corresponding tap 160.

Generally, it is appropriate for an IDS to reside as close as possible to the network firewall 170 and near the demarcation point to the outside (e.g., external network 103) of the given network 100. Indeed, it is useful if IDSs can reside on both sides (e.g., internal network 101 and external network 103) of the firewall 170. Many high-availability networks include an array constructed that will permit multiple paths for packets to transit the firewall 170 in both directions, dependent on such factors as, for example, network conditions and loading. Consequently, any packet can use any of the paths illustrated in FIG. 1 at any given time. Thus, time-synchronized IDSs would be needed on each link to be sure that all paths are covered. However, to perform time-sensitive coordinated pattern matching across eight or more links is a complex task.

For purposes of illustration, it can cost from $10,000 to $100,000 for an IDS system, and from $6,000 (for gigabit Ethernet) to $20,000 (for OC12) to $400,000 (for OC192) for each link covered. Assuming that the interfaces are gigabit Ethernet (e.g., 8*$6,000/interface=$48,000) and a "middle-of-the-road" IDS system (e.g., $50,000 for the eight IDSs 105 illustrated in FIG. 1) is used that is capable of handling the synchronization issues, an IDS solution for the network 100 illustrated in FIG. 1 would cost at least approximately $48,000+$50,000=$98,000. Because of the high costs involved, many companies might not elect to cover all of the accessible points in the network 100, especially in the external network 103.

Even if IDSs are installed as illustrated in FIG. 1 so that the user will know what is occurring outside the firewall 170 (e.g., in the external network 103), the IDS system can still suffer from a lack of synchronicity between packet capture devices. For example, if the time base used to timestamp the captured packets is not accurate, a skewed picture of the data will be received, which can result in a poor diagnosis of the network activity (e.g., missed detection of possible intrusions).

SUMMARY OF THE INVENTION

A system and method are disclosed for consolidating network streams for network analysis. In accordance with exemplary embodiments of the present invention, according to a first aspect of the present invention, a system for consolidating network streams for network analysis includes a plurality of network streams. Each of the plurality of network streams is associated with a communication path through a network. The system includes a consolidator in communication with each of the plurality of network streams. The consolidator is configured to prevent the plurality of network streams from being networked together. The consolidator is configured to create at least one virtual local area network (VLAN) within the consolidator. The consolidator is configured to pass information on an ingress port of the consolidator associated with the at least one VLAN to egress ports of the consolidator associated with the at least one VLAN. The system includes a network analyzer in communication with the consolidator. The consolidator is configured to consolidate the plurality of network streams into a single network stream for application to the network analyzer to determine characteristics of each of the plurality of network streams.

According to the first aspect, the consolidator can be configured to disable learning of network addresses from information received via the plurality of network streams to disable networking together of the plurality of network streams. The consolidator can be configured to enable network flooding to pass information on the ingress port associated with the at least one VLAN to the egress ports associated with the at least one VLAN. The network analyzer can be associated with one of the VLANs. The network analyzer can be configured to receive the single network stream output from the egress port associated with the one of the VLANs. The system can include a plurality of analysis devices in communication with the consolidator. Each of the plurality of analysis devices can be associated with at least one of the VLANs. Each of the plurality of analysis devices can be configured to receive at least one of the plurality of network streams output from the egress ports associated with the corresponding at least one of the VLANs. A quantity of created VLANs can be associated with a quantity of analysis devices in communication with the consolidator.

According to the first aspect, at least one of the plurality of analysis devices can comprise, for example, a local area network (LAN) probe. At least one of the plurality of analysis devices can comprise, for example, a network test device. The network analyzer can comprise, for example, an intrusion detection system. According to an exemplary embodiment of the first aspect, a single intrusion detection system can be in communication with the consolidator. The consolidator can comprise, for example, a network switch or the like. The consolidator can be in communication with each of the plurality of network streams using, for example, optical taps or the like.

According to a second aspect of the present invention, a method of consolidating network streams for network analysis comprises the steps of: a.) receiving a plurality of network streams, wherein each of the plurality of network streams is associated with a communication path through a network; and b.) consolidating the plurality of network streams into a single network stream. Step (b) comprises the steps of: b1.) preventing the plurality of network streams from being networked together; b2.) creating at least one virtual local area network (VLAN); b3.) receiving information associated with the at least one VLAN; and b4.) outputting the information associated with the at least one VLAN. The method comprises the step of: c.) analyzing the single network stream to determine characteristics of each of the plurality of network streams.

According to the second aspect, step (b1) can comprise the step of: 1.) disabling learning of network addresses from information received via the plurality of network streams to disable networking together of the plurality of network streams. Step (b4) can comprise the step of: 1.) enabling network flooding to output the information associated with the at least one VLAN. Step (b) can comprise the step of: b5.) switching the plurality of network streams into the single network stream. The information associated with the at least one VLAN can comprise, for example, at least one of the plurality of network streams. According to an exemplary embodiment of the second aspect, step (c) can comprise the step of: c1.) detecting intrusions in the network. According to an alternative exemplary embodiment of the second aspect, step (c) can comprise the step of: c1.) probing a local area network (LAN).

According to a third aspect of the present invention, a system for consolidating network streams for network analysis includes a plurality of network streams. Each of the plurality of network streams is associated with a communication path through a network. The system includes means for consolidating each of the plurality of network streams. The consolidating means is configured to prevent the plurality of network streams from being networked together. The consolidating means is configured to create at least one virtual local area network (VLAN) means within the consolidating means. The consolidating means is configured to pass information on an ingress port means of the consolidating means associated with the at least one VLAN means to egress port means of the consolidating means associated with the at least one VLAN means. The system includes means for network analyzing in communication with the consolidating means. The consolidating means is configured to consolidate the plurality of network streams into a single network stream for application to the network analyzing means to determine characteristics of each of the plurality of network streams.

According to the third aspect, the consolidating means can be configured to disable learning of network addresses from information received via the plurality of network streams to disable networking together of the plurality of network streams. The consolidating means can be configured to enable network flooding to pass information on the ingress port means associated with the at least one VLAN means to the egress port means associated with the at least one VLAN means. The network analyzing means can be associated with one of the VLAN means. The network analyzing means can be configured to receive the single network stream output from the egress port means associated with the one of the VLAN means. The system can include a plurality of means for analyzing in communication with the consolidating means. Each of the plurality of analyzing means can be associated with at least one of the VLAN means. Each of the plurality of analyzing means is configured to receive at least one of the plurality of network streams output from the egress port means associated with the corresponding at least one of the VLAN means. A quantity of created VLAN means can be associated with a quantity of analyzing means in communication with the consolidating means.

According to the third aspect, at least one of the plurality of analyzing means can comprise, for example, a means for probing a local area network (LAN). At least one of the plurality of analyzing means can comprise, for example, a means for network testing. The network analyzing means can comprise, for example, a means for detecting network intrusions. According to an exemplary embodiment of the third aspect, a single network intrusion detecting means can be in communication with the consolidating means. The single network stream can be passed to the single network intrusion detecting means by the consolidating means. The consolidating means can comprise, for example, a means for network switching. The consolidating means can be in communication with each of the plurality of network streams using, for example, optical means for tapping.

According to a fourth aspect of the present invention, a network analysis system includes a consolidator device in communication with each of a plurality of network streams of information. The consolidator device is configured to disable learning of network addresses from information received via the plurality of network streams of information. The consolidator device is configured to enable flooding of network packets. The consolidator device is configured to create at least one virtual local area network (VLAN) within the consolidator device. The system includes a network analysis device in communication with the consolidator device. The consolidator device is configured to consolidate the plurality of network streams of information into a single network stream for application to the network analysis device.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for consolidating network streams for network analysis. According to an exemplary embodiment, a consolidator, such as, for example, a network switch or the like, can be configured to consolidate multiple network streams and present them as a single network stream to a single intrusion detection system (IDS) or other like network analysis device. For example, to use a network switch as a consolidator, switching properties of the network switch can be modified to configure the network switch to stop networking. More particularly, learning can be disabled in the network switch to prevent the network switch from attempting to network the multiple streams together. Furthermore, any suitable number of virtual local area networks (VLANs) can be created inside the network switch that can be used to direct monitor traffic to the appropriate network analysis device. Additionally, flooding can be enabled on the network switch, so that information that appears on any port in the VLAN is repeated to other ports on the same VLAN. Accordingly, the consolidator can support the ability to disable learning, enable flooding, create and manipulate VLANs.

According to exemplary embodiments, the consolidator can be configured for any application and the configuration can be changed whenever necessary. Thus, the consolidator can be used to consolidate any suitable number or type of network streams into a single network stream. The single network stream can then be applied to any suitable type of network analysis, network test, intrusion detection or other like device or element. Exemplary embodiments of the present invention provide a flexible and reliable approach to test access for, for example, wide area network (WAN) links and the like that can make the most efficient use of available equipment. Any arbitrary number of VLANs can be created as and when needed, and any fraction of the ingress traffic can be directed to any or all of the egress ports to be analyzed by the appropriate network analysis device(s).

Figure 2:
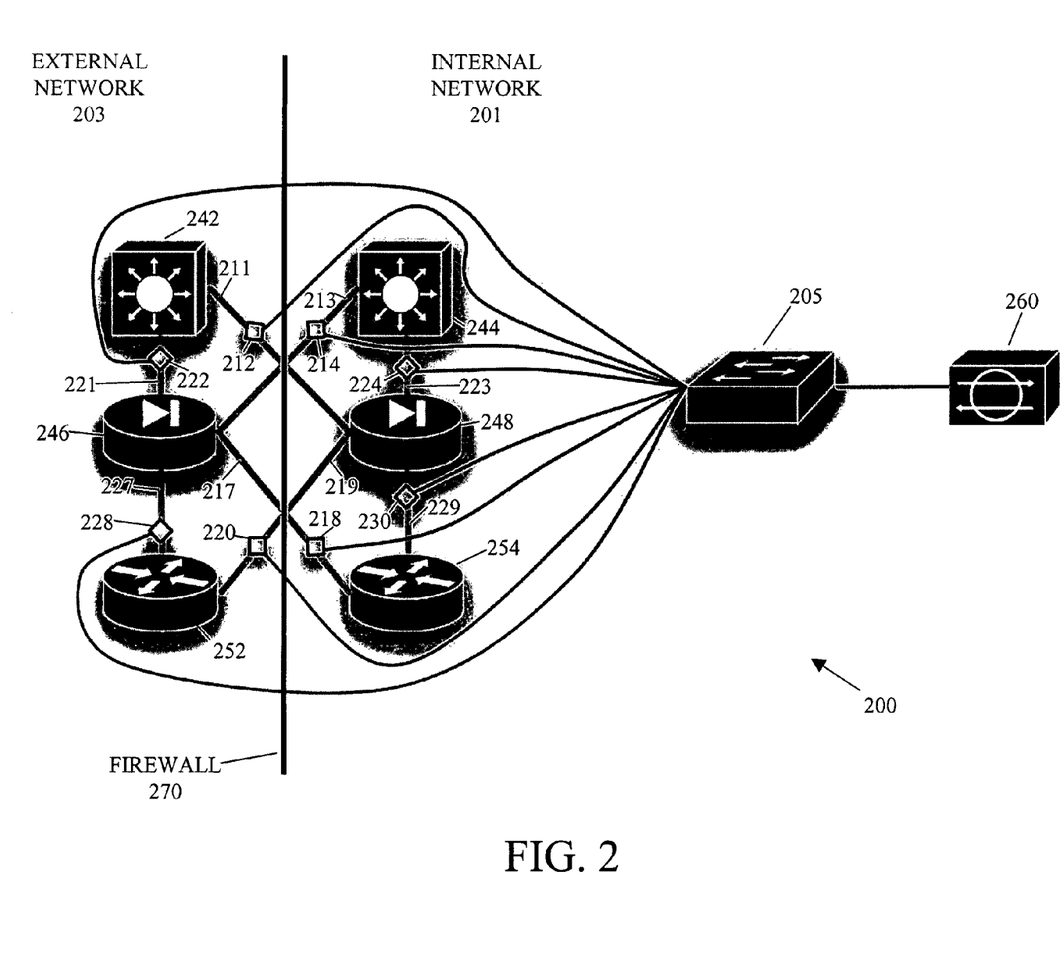
FIG. 2 is a diagram illustrating a system for consolidating network streams for network analysis, in accordance with an exemplary embodiment of the present invention.

These and other aspects of the present invention will now be described in greater detail. FIG. 2 is a diagram illustrating a system 200 for consolidating network streams for network analysis, in accordance with an exemplary embodiment of the present invention. The system 200 includes a plurality of network streams 211, 213, 217, 219, 221, 223, 227 and 229. Each of the plurality of network streams 211, 213, 217, 219, 221, 223, 227 and 229 is associated with a communication path through a network. For example, each of the plurality of network streams 211, 213, 217, 219, 221, 223, 227 and 229 can comprise a communication or other suitable network link between network devices 242, 244, 246, 248, 252 and 254 for passing or otherwise communicating packet data or other appropriate information between such devices through the network. Each of the network devices 242, 244, 246, 248, 252 and 254 can comprise any suitable type of network element or device that is capable of passing, routing, switching or otherwise communicating network traffic (e.g., packet information) between the network devices and through the network.

According to an exemplary embodiment, a firewall 270 can be used to separate an internal network 201 (e.g., an intranet) from an external network 203 (e.g., an extranet or the Internet) to prevent, for example, unwanted intrusions into the internal network 201. For example, network devices 244, 248 and 254 can reside "behind" the firewall 270 within the internal network 201. Network devices 242, 246 and 252 can reside "outside" the firewall 270 in the external network 203. However, other configurations of the network can be used. Based on the network configuration, multiple paths can exist for packets to transit the firewall 270 in both directions. Consequently, any packet can use any of the paths illustrated in FIG. 2 at any given time.

The system 200 includes a consolidator 205 in communication with each of the plurality of network streams 211, 213, 217, 219, 221, 223, 227 and 229. For example, the consolidator 205 can be physically inserted into the network streams. However, according to an exemplary embodiment, the consolidator 205 can be in communication with each of the plurality of network streams 211, 213, 217, 219, 221, 223, 227 and 229 using any suitable type of tap or connector, such as an optical tap or the like. As illustrated in FIG. 2, the consolidator 205 is in communication with each of the plurality of network streams 211, 213, 217, 219, 221, 223, 227 and 229 using taps 212, 214, 218, 220, 222, 224, 228 and 230, respectively. The consolidator 205 can be in communication with each of the taps 212, 214, 218, 220, 222, 224, 228 and 230 using any suitable type of electrical connection capable of communicating information from the respective plurality of network streams 211, 213, 217, 219, 221, 223, 227 and 229.

According to exemplary embodiments, the consolidator 205 is configured to consolidate the plurality of network streams 211, 213, 217, 219, 221, 223, 227 and 229 into a single network stream. To perform such consolidation, the switching properties of the consolidator 205 can be modified and configured to stop networking, as discussed in more detail below. In particular, the consolidator 205 can support the ability to disable learning, to enable flooding, and to create and manipulate VLANs. Additionally, the consolidator 205 can include a backplane bandwidth sufficient to handle most, if not all, of the packets or other information transmitted through the network.

For example, the consolidator 205 is configured to prevent the plurality of network streams 211, 213, 217, 219, 221, 223, 227 and 229 from being networked together. In other words, the consolidator 205 is configured to disable learning of network addresses (e.g., disabling of MAC address learning) from information received via the plurality of network streams 211, 213, 217, 219, 221, 223, 227 and 229 to disable networking together of the plurality of network streams 211, 213, 217, 219, 221, 223, 227 and 229. By preventing such networking together, the network or other information contained in each network stream can be maintained within the resulting single network stream, so that each network stream can be subsequently analyzed from the single network stream.

Additionally, the consolidator 205 is configured to create at least one VLAN within the consolidator 205. Any suitable number of VLANs can be created within the consolidator 205 that can be used to direct monitor traffic (e.g., information from the plurality of network streams 211, 213, 217, 219, 221, 223, 227 and 229) to another device for analysis.

Furthermore, the consolidator 205 is configured to pass information on an ingress port of the consolidator associated with the at least one VLAN to egress ports of the consolidator associated with the at least one VLAN. In other words, the consolidator 205 is configured to enable network flooding to pass information on the ingress port associated with the at least one VLAN to the egress ports associated with the same at least one VLAN. Thus, any information that arrives on an ingress port associated with a VLAN will be repeated to egress ports on the same VLAN.

The system 200 can include a network analyzer 260 in communication with the consolidator 205. According to exemplary embodiments, the single network stream is applied or otherwise forwarded to the network analyzer 260 to determine characteristics of each of the plurality of network streams 211, 213, 217, 219, 221, 223, 227 and 229. The network analyzer 260 is associated with one of the VLANs created within the consolidator 205. Thus, the network analyzer 260 is configured to receive the single network stream output from the egress port of the consolidator 205 associated with the corresponding VLAN. The network analyzer 260 is configured to determine characteristics of each of the plurality of network streams 211, 213, 217, 219, 221, 223, 227 and 229 from the consolidated, single network stream. The network analyzer 260 can determine any appropriate characteristic(s) of each of the network streams. For example, the network analyzer 260 can comprise any suitable type of intrusion detection system (IDS) or the like. Such an IDS can be used to determine characteristics of each of the network streams such as, for example, unwanted and/or unwarranted intrusions into the internal network 201 from the ingress traffic (e.g., hackers), nefarious or circumspect network activity, breach of policy on ingress or egress traffic in the network, or the like. The nature and type of characteristics that can be determined by the network analyzer 260 will depend on such factors as, for example, the nature and type of information communicated in the network streams, the nature and type of network analyzer 260 used to analyze the network streams, and the like.

According to an exemplary embodiment of the present invention, the network analyzer 260 can comprise a single IDS. In other words, a single IDS can be used to analyze the information from most or all of the plurality of network streams 211, 213, 217, 219, 221, 223, 227 and 229 using the single network stream that is passed to the IDS from the consolidator 205, rather than having separate IDSs for each of the network streams. In such a configuration, the IDS can be any suitable type of IDS that is capable of analyzing information from each of the network streams that are contained in the single network stream.

However, the system 200 can include any suitable number of analysis devices in communication with the consolidator 205. Each analysis device is associated with at least one of the VLANs. Accordingly, each of the analysis devices is configured to receive at least one of the plurality of network streams 211, 213, 217, 219, 221, 223, 227 and 229 output from the egress ports associated with the corresponding VLANs. For example, at least one of the analysis devices can comprise a local area network (LAN) probe, a network test device, or any other suitable type of analysis device.

Figure 3:
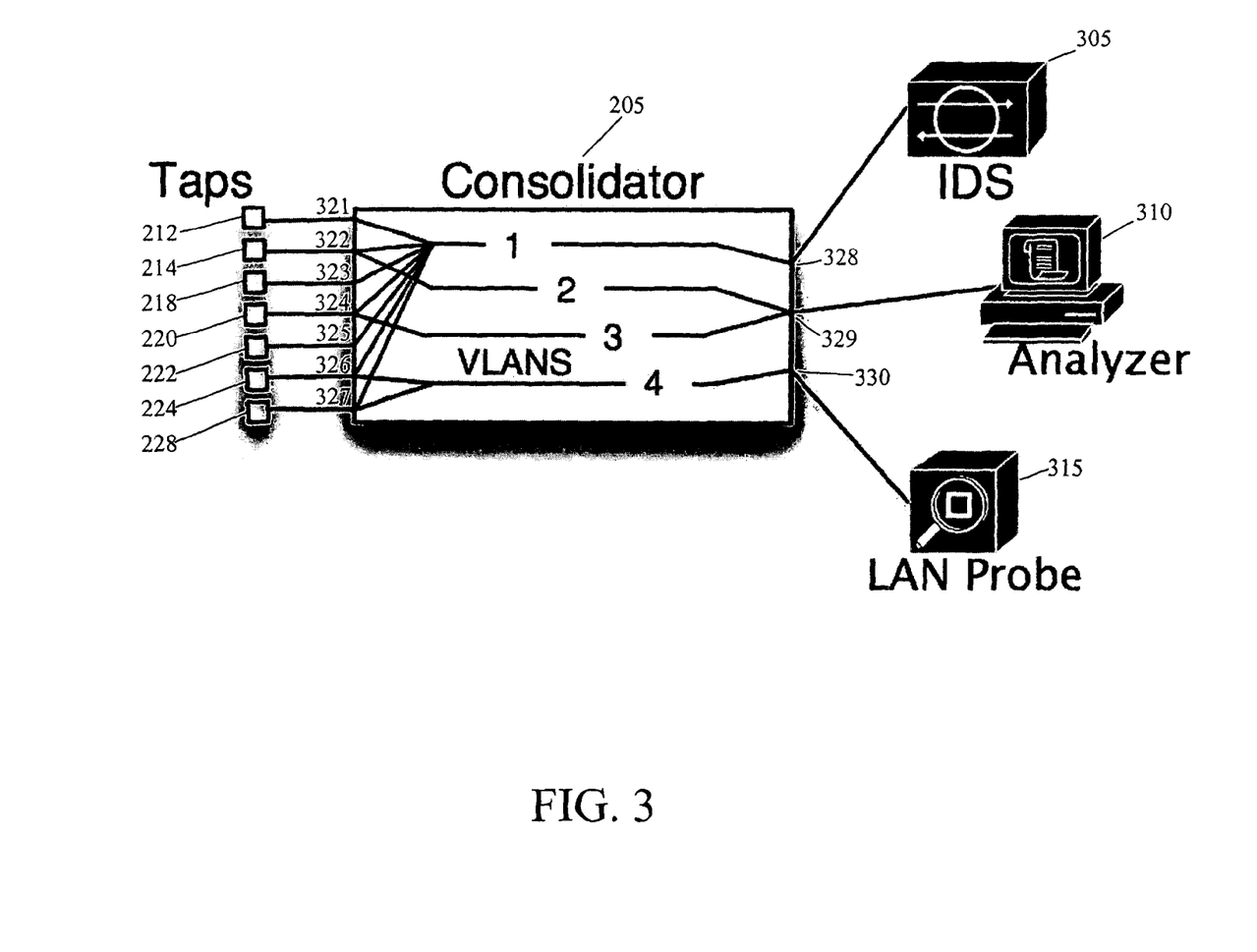
FIG. 3 is a diagram illustrating an example of the internal operation of the consolidator, in accordance with an exemplary embodiment of the present invention.

For purposes of illustration and not limitation, FIG. 3 is a diagram illustrating an example of the internal operation of the consolidator 205, in accordance with an exemplary embodiment of the present invention. In the illustration, the consolidator 205 is in communication with network streams 211, 213, 217, 219, 221, 223 and 227 using corresponding taps 212, 214, 218, 220, 222, 224 and 228 to attach each of the network streams to the appropriate VLAN. The consolidator 205 is also in communication with an IDS 305, an analyzer 310 and a LAN probe 315. According to exemplary embodiments, a suitable number of VLANs are configured within the consolidator 205 (in the present example, four) that will be sufficient to provide access to the number of analysis devices (in the illustration, three). In the consolidator 205 illustrated in FIG. 3, all ingress ports 321-327 are configured to VLAN 1. The egress port 328 on the consolidator 205 to which the IDS 305 is attached is also configured to VLAN 1. Thus, all of the network traffic from each of the network streams received on all of the ingress ports 321-327 of the consolidator 205 will be passed to the IDS 205 as a single network stream. Similarly, ingress port 322 is connected to VLAN 2, and VLAN 2 is connected to the analyzer 310 via egress port 329. Ingress port 324 is connected to VLAN 3, and VLAN 3 is also connected to the analyzer 329 via egress port 329. Ingress ports 326 and 327 are connected to VLAN 4, and VLAN 4 is connected to the LAN probe 315 via egress port 330.

Thus, the consolidator 205 is configured to pass information from each of the network streams, or any combination of network streams, to the appropriate analysis device using the VLANs. Additional or alternative VLANs can be created and/or modified within the VLAN to support the one or more analysis devices in communication with the consolidator 205. The consolidator 205 can be configured for any suitable application and the configuration can changed whenever necessary. Thus, the consolidator 205 can be used to consolidate any suitable number or type of network streams into a single network stream. The single network stream can then be applied to any suitable type of network analysis, network test, intrusion detection or other like device or element for analysis.

According to an exemplary embodiment of the present invention, the consolidator 205 can comprise any suitable type of network switch. Accordingly, the network switch is capable of supporting the ability to disable learning, to enable flooding, and to create and manipulate VLANs, and can include a backplane bandwidth sufficient to handle most, if not all, of the packets transmitted through the network. Such configuration of the network switch will depend on the nature and type of network switch that is used.

For example, any CISCO™ network switch can be used that supports the CISCO™ internetworking operating system (IOS). In such CISCO™ network switches, by default, each interface automatically learns the MAC addresses of entering traffic, and the firewall services module (FWSM) adds corresponding entries to the MAC address table. To disable MAC address learning, the following command can be entered at the network switch console:

FWSM/contexta(config)# mac-learn interface_name disable

To enable flooding, the following commands can be entered at the network switch console (e.g., for port 4/1, resulting in the illustrated response):

Console>(enable) set port unicast-flood 4/1 enable
Unicast Flooding is successfully enabled on the port 4/1.
Console>(enable)

Another network switch that can be used for the consolidator 205 is the EXTREME NETWORKS™ network switch. In such network switches, by default, MAC address learning is enabled on all ports. Learning can be disabled on specified ports using the following command entered at the network switch console:

disable learning {flood-list} ports <portlist>

If MAC address learning is disabled, only broadcast traffic, EDP traffic, and packets destined to a permanent MAC address matching that port number are forwarded. The previous command should be used in a secure environment where access is granted via permanent forwarding databases (FDBs) per port. Using the flood-list option disables port learning and configures the ports to act like a hub. When flooding is enabled on a particular port, all frames and packets are passed on to other member ports that also have flooding enabled, which includes all broadcast, multicast, and known and unknown unicast packets (including EDP). To make effective use of this feature on the EXTREME NETWORKS™ network switch, flooding should be enabled on more than one port. For the EXTREME NETWORKS™ network switch, learning and flooding are mutually exclusive. To enable flooding, learning must be disabled. When ports are configured for flooding, the FDB will be flushed for the entire system, which means that all of the entries in the dynamic FDB must be relearned. To disable flooding, enable port learning on the affected ports.

For the EXTREME NETWORKS™ network switch, VLANS can be created and deleted using the following command entered at the network switch console (where "TestBus1" is an example of name for the VLAN):

create vlan TestBus1

To add ports to the created VLAN, the following commands can be entered at the network switch console:

config TestBus1 add port 1
config TestBus1 add port 2
config TestBus1 add port 3
. . . .
config TestBus1 add port n In this way, ports can be added to VLANs as needed. To remove ports, the following command can be entered at the network switch console:

config TestBus1 delete port n

However, according to an exemplary embodiment, the consolidator 205 can comprise any suitable type of network switch or the like. Alternatively, the consolidator 205 can be comprised of any suitable type of electrical or electronic component or device that is capable of performing the functions associated with the consolidator 205 and supports the ability to disable learning, to enable flooding, and to create and manipulate VLANs. Alternatively, the consolidator 205 can be comprised of any combination of hardware, firmware and software that is capable of performing the function associated with the consolidator 205. Additionally, each component or device of system 200 can be in communication with another component or device in the system 200 using any appropriate type of electrical connection that is capable of carrying electrical information. In addition, the communication links or paths between the network elements 242, 244, 246, 248, 252 and 254 can comprised any suitable type of communication medium or channel capable of transmitting and receiving electrical information.

Alternatively, the consolidator 205 can comprise a microprocessor and associated memory that stores the steps of a computer program to perform the functions of the consolidator 205. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming. For example, the actual source code or object code of the computer program can be stored in the memory.

The system 100 can also include, for example, any suitable type of graphical or other user interface configured to provide access to, either locally or remotely, and management of the consolidator 205. Thus, the graphical user interface can be, for example, any suitable Web browser that can support local or remote access to the consolidator 205. The graphical user interface can be displayed on any suitable computer display or monitor capable of displaying graphical and/or textual information to a user and that allows a user to enter information (e.g., commands, information and the like) through, for example, a keyboard, a touch-screen, any type of pointing device, electronic pen, and the like. The graphical user interface can be used by the user to access, control and manage any and all of the functionality of the consolidator 205, including reconfiguring the consolidator 205, creating and managing VLANs, and the like.

Figure 4:
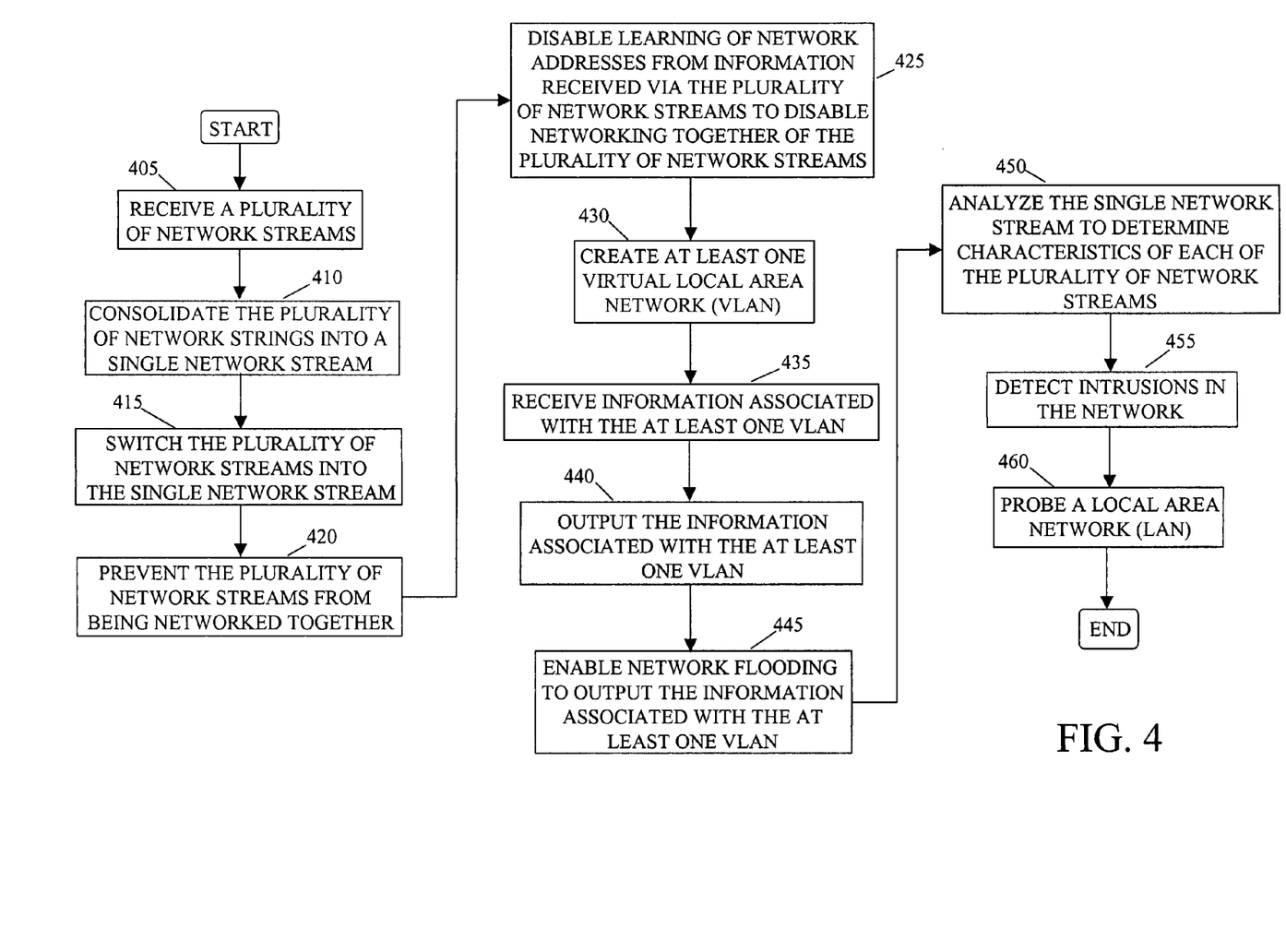
FIG. 4 is a flowchart illustrating steps for consolidating network streams for network analysis, in accordance with an exemplary embodiment of the present invention.

FIG. 4 is a flowchart illustrating steps for consolidating network streams for network analysis, in accordance with an exemplary embodiment of the present invention. In step 405, a plurality of network streams are received. Each of the plurality of network streams is associated with a communication path through a network. In step 410, the plurality of network streams are consolidated into a single network stream. For example, in step 415, the plurality of network streams can be switched into the single network stream. In step 420, the plurality of network streams are prevented from being networked together. For example, in step 425, learning of network addresses from information received via the plurality of network streams can be disabled to disable networking together of the plurality of network streams. In step 430, at least one VLAN is created. In step 435, information associated with the at least one VLAN is received. In step 440, the information associated with the at least one VLAN is output. According to an exemplary embodiment, the information associated with the at least one VLAN can comprise at least one of the plurality of network streams. For example, in step 445, network flooding can be enabled to output the information associated with the at least one VLAN. In step 450, the single network stream is analyzed to determine characteristics of each of the plurality of network streams. For example, in step 455, intrusions in the network can be detected. Alternatively or additionally, in step 460, a local area network (LAN) can be probed.

The steps of a computer program as illustrated in FIG. 4 for consolidating network streams for network analysis can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any network analysis, network test, intrusion detection or other like device or element to monitor network traffic and diagnose network activity. For example, exemplary embodiments can be used in any suitable form of computer network to manage and verify the information being passed through the network to prevent, for example, nefarious or otherwise intrusive activity from disrupting the network.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated by reference herein in their entireties.

What is claimed is:

1. A system for consolidating a plurality of network streams collected from multiple stream tap points on a network for delivery to a plurality of network analyzers, the system including:
   a consolidator including ports, the ports configured to be coupled via the tap points in communication with of the plurality of network streams
      wherein the consolidator prevents the plurality of network streams from being networked together across the tap points,
      wherein the consolidator creates a plurality of virtual local area networks (VLANs) within the consolidator and uses the VLANs to direct packets from particular tap points to egress ports associated with particular VLANs; and
      wherein the consolidator multiplexes network streams from a plurality of the stream tap points into a single analysis stream for a particular network analyzer to process and
         determine stream characteristics in individual streams among the plurality of network streams.

2. The system of claim 1, wherein the particular VLAN is associated via a particular egress port with a particular network analyzer.

3. The system of claim 1, wherein a first tap point and a second tap point are on opposite sides of a switch or router and the prevention of the network streams from being networked together prevents packets from flowing from the first tap point through the consolidator to the second tap point.

4. The system of claim 1, wherein the consolidator is configured to enable network flooding to pass information on the ingress port to a plurality of the egress ports.

5. The system of claim 1, wherein the network analyzer is associated with one of the VLANs, and
   configured to receive the single analysis stream output from the egress port associated with the VLANs.

6. The system of claim 1, comprising:
   a plurality of analysis devices in communication with the consolidator, wherein the analysis devices are
      associated with particular VLANs, and
      configured to receive at least one of the plurality of analysis streams output from the egress port associated with the VLANs.

7. The system of claim 6, wherein a number of VLANs created matches a number of analysis devices.

8. The system of claim 6, wherein at least one of the analysis devices comprises a local area network (LAN) probe.

9. The system of claim 6, wherein at least one of the analysis devices comprises a network test device.

10. The system of claim 6, wherein at least one of the analysis devices comprises an intrusion detection system.

11. The system of claim 10, wherein a single intrusion detection is coupled to the consolidator.

12. The system of claim 6, wherein the consolidator comprises a specially programmed network switch.

13. The system of claim 1, further including a plurality of optical taps positioned at at least some of the tap points.

14. A method of consolidating a plurality of network streams collected from multiple stream tap points on a network for network analysis for delivery to a plurality of network analyzers, the method including:
   receiving packets in a plurality of network streams via ports coupled to the network via the tap points
      preventing the plurality of network streams from being networked together across the tap points,
      creating a plurality of virtual local area networks (VLANs) within consolidator hardware and using the VLANs to direct packets from particular tap points to egress ports associated with particular VLANs; and
      multiplexing network streams from a plurality of the stream tap points into a single analysis stream for a particular network analyzer to
         process and
         determine stream characteristics in individual streams among the plurality of network streams.

15. The method of claim 14, further including mapping the particular VLAN via a particular egress port to a particular network analyzer.

16. The method of claim 14, wherein a first tap point and a second tap point are on opposite sides of a switch or router and preventing the network streams from being networked together prevents packets from flowing from the first tap point through the consolidator to the second tap point.

17. The method of claim 14, further including the consolidator uses network flooding to pass information on the ingress port to a plurality of the egress ports.

18. The method of claim 14, further including associating with one of the VLANs the network analyzer configured to receive the analysis stream output from the egress port associated with the VLANs.

19. The method of claim 14, further including associating with a plurality of the VLANs a plurality of respective analysis devices in communication with the consolidator, wherein the analysis devices are
   associated with particular VLANs, and
   configured to receive at least one of the plurality of analysis streams output from the egress port associated with the VLANs.

20. The method of claim 19, wherein a number of VLANs created matches a number of analysis devices.

21. The method of claim 19, wherein at least one of the analysis devices comprises a local area network (LAN) probe.

22. The method of claim 19, wherein a single intrusion detection is coupled to the consolidator.

* * * * *